(12) United States Patent
Koivukangas et al.

(10) Patent No.: US 7,274,199 B2
(45) Date of Patent: Sep. 25, 2007

(54) METHOD AND ARRANGEMENT OF TESTING DEVICE IN MOBILE STATION

(75) Inventors: Tapio Koivukangas, Oulu (FI); Veikko Loukusa, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/552,403

(22) PCT Filed: Apr. 7, 2004

(86) PCT No.: PCT/FI2004/000215

§ 371 (c)(1),
(2), (4) Date: Oct. 7, 2005

(87) PCT Pub. No.: WO2004/091236

PCT Pub. Date: Oct. 21, 2004

(65) Prior Publication Data

US 2006/0183470 A1    Aug. 17, 2006

(30) Foreign Application Priority Data

Apr. 11, 2003   (EP) .................................. 03100979

(51) Int. Cl.
*G01R 31/28* (2006.01)
(52) U.S. Cl. ...................... 324/763; 714/733
(58) Field of Classification Search ............ None
See application file for complete search history.

(56) References Cited

U.S. PATENT DOCUMENTS 5,481,186 A   1/1996  Heutmaker et al.
5,889,837 A   3/1999  Sands
6,118,982 A   9/2000  Ghisler et al.
6,404,293 B1  6/2002  Darabi et al.

(Continued)

FOREIGN PATENT DOCUMENTS

DE    198 41 470 A1    4/2000

(Continued)

OTHER PUBLICATIONS

Anthony P. Ambler, Mosha Ben Bassat and Louis Y. Ungar, "Economics of Diagnosis" Autotestcon, 97. 1997 IEEE Autotestcon Proceedings Ahanheim, CA, USA Sep. 22-25, 1997, New York, NY USA, IEEE, pp. 435-445. XP010253057 ISBN: 0-7803-4162-7.

(Continued)

*Primary Examiner*—Ernest Karlsen
(74) *Attorney, Agent, or Firm*—Hollingsworth & Funk, LLC (57) ABSTRACT

The invention relates to a method and an arrangement of testing a device, such as a peripheral device, in a mobile station. The arrangement comprises a signal generator for generating a test signal for the device under test, a measurement unit integrated into the mobile station for measuring en electric quantity from a feeding line of the device under test, and an analyser for determining an electric response of the device to the test signal by using the electric quantity. According to the invention, at least a portion of the testing procedure composed of generating the test signal and determining the electric response of the device is performed using a functional unit, such as the signal generator or the analyser, integrated into the mobile station.

20 Claims, 4 Drawing Sheets

U.S. PATENT DOCUMENTS

| | | | | |
|---|---|---|---|---|
| 6,681,354 B2 * | 1/2004 | Gupta | ......................... | 714/725 |
| 6,850,081 B1 * | 2/2005 | Birdsley et al. | ............ | 324/752 |
| 7,000,148 B2 * | 2/2006 | Kolof et al. | .................. | 714/27 |

FOREIGN PATENT DOCUMENTS

| | | |
|---|---|---|
| EP | 0 525 941 | 2/1993 |
| EP | 0 759 680 A1 | 2/1997 |
| EP | 0 825 734 A2 | 2/1998 |
| WO | 01/63827 A1 | 8/2001 |

OTHER PUBLICATIONS

Yervant Zorian, "Built-In-Self-Test", Microelectronic Engineering, Elsevier Publishers, BV., Amsterdam, NL, vol. 49, No. 1-2, Nov. 1999, pp. 135-138. XP004182057, ISSN: 0167-9317.

Louis Y. Ungar et al., "IEEE-1149.X Standards: Achievements vs. Expectations", 2001 IEEE Autotestcon Proceedings. IEEE Systems Readiness Technology Conference. Autotestcon 2001, Valley Forge, PA, Aug. 20-23, 2001, IEEE Autotestcon Proceedings: IEEE Systems Readiness Technology Conference, New York, NY: IEEE, US. vol. Conf. 97, XP 010556098, ISBN: 0-7803-7094-5.

Yue-Tsang Chen et al.: "Test Waveform Shaping in Mixed Signal Test Bus by Pre-Equalization", VLAI Test Symposium, 19th IEEE Proceedings on VTS 2001 Apr. 29-May 3, 2001, Piscataway, NJ, USA, IEEE, Apr. 29, 2001, pp. 260-265, XP010542396 ISBN: 0-7695-1122-8.

Lu Y et al.: "Structure and Metrology for a Single-wire Analog Testability Bus", in Proceedings of the International Test Conference, Washington, Oct. 2-6, 1994, New York, IEEE, US, Oct. 2, 1994, pp. 919-928, XP000520055 ISBN: 0-7803-2103-0.

Gielen et al., "Computer-Aided Design of Analog and Mixed-Signal Integrated Circuits", Proceedings of the IEEE, vol. 88, No. 12, Dec. 2000, pp. 1825-1852.

Toner et al., "Towards Built-In-Self-Test for SNR Testing of a Mixed-Signal IC", Proceedings of the International Symposium on circuits and Systems (ISCS), Chicago, May 3-6, 1993, IEEE, US, vol. 2, pp. 1599-1602.

* cited by examiner

METHOD AND ARRANGEMENT OF TESTING DEVICE IN MOBILE STATION

FIELD

The invention relates to a method and an arrangement of testing a device in a mobile station.

BACKGROUND

As the output of production lines manufacturing mobile stations, such as mobile phones, has increased, specific care has to be taken to improve performance of the testing procedure and fault detection of the final product. A substantial portion of the testing procedure is aimed at testing electrical components and peripheral devices, such as display, vibrating battery, audio interface and keyboard of a mobile station.

In prior art, the testing procedure of devices of mobile stations is based on generating a test signal and determining the response of the device under test by using external test equipment, such as a signal generator and a signal analyser.

The problems with the prior art testing procedures are several. Using external test equipment requires a complicated and expensive set of electronic and mechanical devices and necessitates accurate placement of the mobile station to the test platform in order to obtain a physical coupling, such as galvanic connection, between the external test equipment and the mobile station. The physical connection between the external test equipment and the mobile station is prone to failures, thus reducing reliability of the test.

BRIEF DESCRIPTION OF THE INVENTION

An object of the invention is to provide an improved method and arrangement of testing a device in a mobile station. According to an aspect of the invention, there is provided a method of testing a device of a mobile station, the method comprising: generating an electric test signal for testing a device, feeding the electric test signal to the device by a feeding line; measuring an electric quantity from the feeding line by a measurement unit integrated into the mobile station; determining an electric response of the device to the electric test signal based on the electric quantity; and performing at least the portion of a testing procedure by using a functional unit integrated into the mobile station, the testing procedure comprising generating the electric test signal and determining the electric response of the device.

According to another aspect of the invention, there is provided an arrangement for testing a device of a mobile station, comprising: a signal generator for generating an electric test signal for testing a device; a feeding line connected to the signal generator and the device for feeding the electric test signal to the device; and the mobile station further comprises a measurement unit connected to the feeding line for measuring an electric quantity from the feeding line; the mobile station further comprises an analyser connected to the measurement unit for determining an electric response of the device to the electric test signal based on the electric quantity; and at least a portion of a testing arrangement is integrated into the mobile station, the testing arrangement comprising the signal generator and the analyser.

Preferred embodiments of the invention are described in the dependent claims.

The method and system of the invention provide several advantages. In an aspect, the invention reduces the need for external test equipment, thus decreasing the cost of a test line, simplifying the testing procedure and increasing the output and reliability of a test line in mass production of mobile stations.

LIST OF DRAWINGS

In the following, the invention will be described in greater detail with reference to the preferred embodiments and the accompanying drawings, in which.

DESCRIPTION OF EMBODIMENTS

Figure 1:
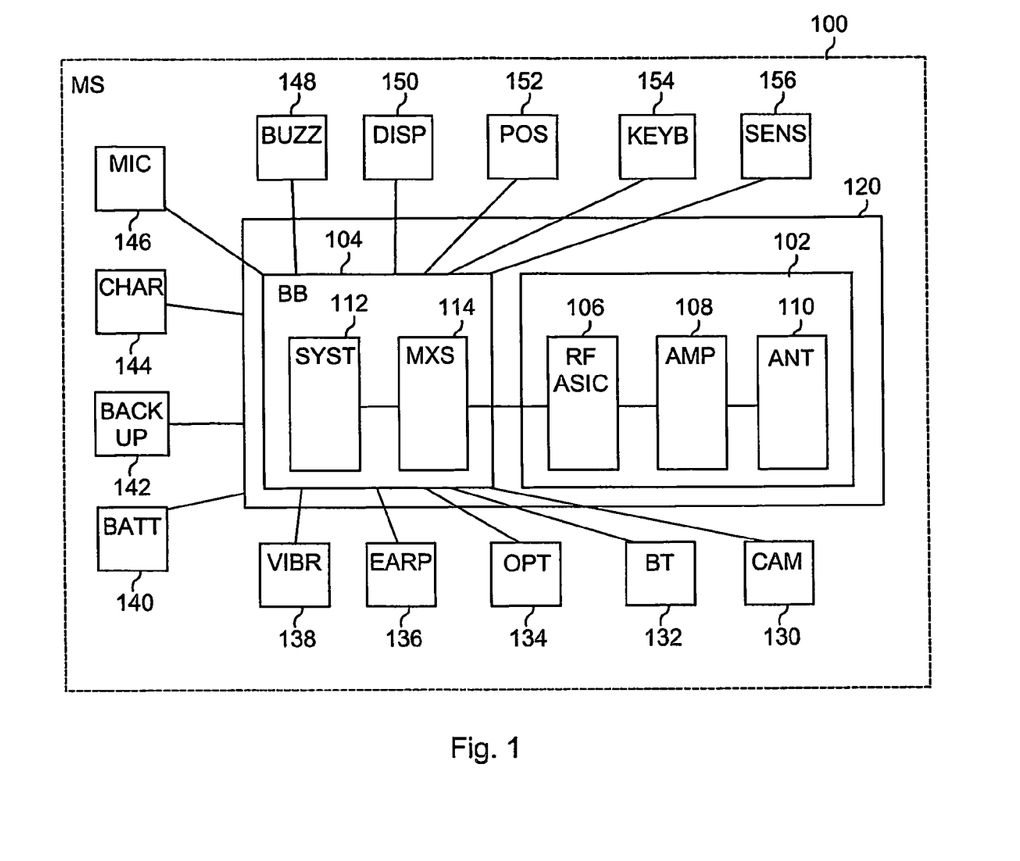
FIG. 1 shows an example of the structure of a mobile station by means of a block diagram.

FIG. 1 shows an example of the structure of a mobile station 100 by means of a block diagram. The mobile station 100 comprises a base band part (BB) 104 and a radio frequency part (RF) 102 placed, for example, on a printed circuit board 120.

The base band part 104 comprises a system block (SYST) 112 and a mixed signal block (MXS) 114 connected to the system block 112. The system block 112 includes, for example, a digital signal processor (DSP) and memory means, such as a static random access memory (SRAM) and a read-only memory (ROM).

The mixed signal block 114 includes, for example, analogue-to-digital and digital-to-analogue converters for the payload signal transmitted and received by the mobile station 100.

The radio frequency part 102 comprises a radio frequency application specific circuit (RF ASIC) 106, an amplifier unit (AMP) 108 and an antenna unit (ANT) 110.

The radio frequency ASIC 106 comprises, for example, converters for up-converting the base band signals to radio frequency band and down-converting signals on the radio frequency band to base band.

The amplifier unit 108 comprises, for example, power amplifiers for amplifying low-power signals from the radio frequency ASIC 106 and feeding the amplified signals to the antenna unit 110.

Furthermore, the amplifier unit 108 may comprise a low-noise amplifier for amplifying a signal received from the antenna unit 110.

The antenna unit 110 comprises at least one antenna element for implementing the radio interface between the mobile station 100 and a network. The antenna unit 110 may also include a filter means, such as a duplex filter, for filtering signals transmitted and received by the antenna unit 110.

The mobile station 100 comprises a peripheral device, which can be integrated into the mobile station 100, or which can be external to the mobile station 100.

FIG. 1 shows the following peripheral devices of the mobile station 100: a camera 130, an auxiliary radio transceiver 132, an optical port 134, an earphone 136, a microphone 146, a vibrator 138, a battery 140, a backup unit 142, a charger 144, a buzzer 148, a display 150, a positioning device 152, a keyboard 154, and a sensor 156.

The camera 130 may be a digital camera integrated into the mobile station 100 or connected to the mobile station 100 via an auxiliary port. In an embodiment, the camera 130 is a video camera connected to the mobile station 100.

The auxiliary radio transceiver 132 may be, for example, a Blue Tooth transceiver for implementing a radio interface between an auxiliary radio device, such as a Blue Tooth hands-free device, and the mobile station 100.

The optical port 134 provides an optical bus for communication between the mobile station 100 and an external device, such as another mobile station or a computer equipped with an optical port and supporting a common protocol. The optical port 134 comprises electro-optical components, such as diodes, for performing conversion between an electric signal and an optical signal. In an embodiment, the optical port 134 is an infrared port.

The earphone 136 and the microphone 146 compose an audio user interface for the mobile station 100. The earphone 136 converts an electric vibration into a voice vibration, and thus in general represents a loudspeaker. The earphone 136 may include a diaphragm connected to an electric circuit transforming the electric signal into movement of the diaphragm.

The microphone 146 converts sound waves into electric signals. The microphone 146 may include a diaphragm connected to an electric circuit generating an electric signal from the vibration of the diaphragm. The earphone 136 and the microphone 146 may be integrated into the mobile station 100, or they can be external to the mobile station 100 connected to the mobile station 100 by cables.

The vibrator 138 comprises an electric motor and mechanism for providing a vibrating alarm. The vibrator may be integrated into the battery of the mobile station 100.

The backup unit 142 comprises memory components for storing, for example, time information, while power from the main power source, such as a battery, is not available. The charger 144 provides power for charging a battery of the mobile station 100. The charger usually comprises a transformer for transforming, for example, distribution voltage to battery voltage. Also, the charger may comprise a rectifier for converting alternating current to direct current.

The buzzer 148 provides sound effects in a narrow frequency band for informing, for example, about an incoming call or a message. The buzzer 148 may comprise a piezoelectric element for sound production.

The display 150 provides a visual user interface. The display 150 may comprise an LCD (Liquid Crystal Device) for transforming an electric signal to an optical image.

The positioning device 152 provides position information and possibly reference time for the mobile station 100. The positioning device may be implemented in the mobile station 100, or it can be an external device. In an embodiment, the positioning device 152 is a GPS (global positioning system) terminal.

The keyboard 154 comprises switches for converting a mechanical movement into a change in electric conductivity. Furthermore, the keyboard 154 may comprise illuminating means, such as diodes, for illuminating background of the keyboard 154.

The sensor 156 may measure physical quantities, such as temperature, pressure, acceleration, humidity, and illumination. The sensor 156 may include, for example, temperature sensitive resistors, film capacitors, and light diodes.

The invention is related to testing a device of a mobile station 100. A device, in general, may be an electric component or a functional entity composed of electric components. An electric component may be a resistor, a capacitor, a coil, an amplifier, a transistor, a diode, a memory circuit or a combination thereof. The device may also be an integrated circuit or a portion of an integrated circuit. The device to be tested may be located anywhere in the mobile station.

FIG. 1 shows an exemplified structure of a mobile station 100, and the details and implementation of the base band part 102 and the radio frequency part 102 may vary in many ways. In this example, the peripheral devices 130-156 are connected to the base band part 104. The implementation of the connection between a peripheral device 130-156 and the base band part 104 may vary depending on the layout of the electronics in the mobile station 100. In an embodiment, a peripheral device 130-156 is connected to the mixed signal block 114.

Figure 2:
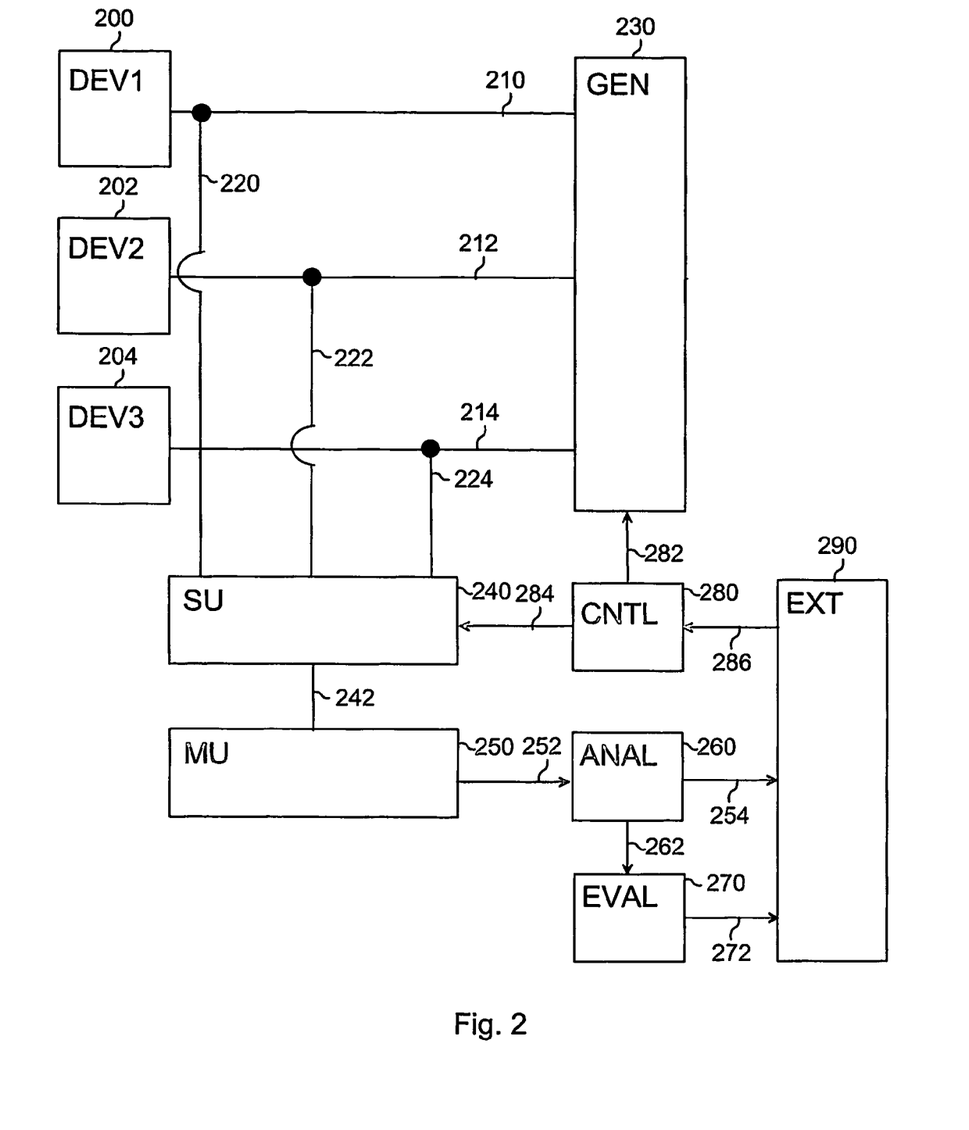
FIG. 2 shows an example of an arrangement for testing a device of a mobile station by means of a block diagram.

FIG. 2 shows an example of an arrangement for testing a device of a mobile station 100 at a block diagram level. FIG. 2 shows devices 200, 202, 204 to be tested, a signal generator 230, feeding lines 210, 212 and 214 connected to the devices 200, 202, and 204, respectively, and the signal generator 230, a measurement unit 250 connected to the feeding line 210, 212, 214, and an analyser 260 connected to the measurement unit 250.

FIG. 2 also shows an external test system 290. The external test system 290 is located outside the mobile station and includes, for example, a computer and memory means. The external test system 290 may be, for example, a portion of a production line test system, or a portion of a test system used in mobile station service. The external test system 290, for example, transmits a command 286 for launching a testing procedure for testing the device 200, 202, 204, and receives a report signal 272 concerning the testing results.

The signal generator 230 generates an electric test signal for testing the device 200, 202, 204, which test signal is fed to the device 200, 202, 204 by the feeding line 210, 212, 214. The feeding line 210, 212, 214 may be, for example, a power supply line providing the device 200, 202, 204 with operating voltage, a control line providing the device 200, 202, 204 with a control signal, an input line providing the device 200, 202, 204 with a payload input signal, or an output signal line providing an output payload signal from the device 200, 202, 204. The input line, for example, delivers an audio signal to the earphone 136 of the mobile station 100. The output signal line, for example, outputs an audio signal from the microphone 146 of the mobile station 100.

In an aspect of the invention, at least a portion of the test arrangement comprising the signal generator 230 and the analyser 260 is integrated into the mobile station such that at least a portion of a testing procedure comprising generating the electric test signal and determining electric response of the device may be performed by using a functional unit integrated into the mobile station 100. The integrated structure relating to the generator 230 and the analyser 260 results in simplification of the test procedure and reduction in external test equipment, such as an external signal generator or a signal analyser. The simplification in the test procedure and the reduction in the external test equipment enables improvement in the output of the test line in mass production and reduced manufacturing costs.

In an embodiment, at least a portion of the signal generator 230 is integrated into the mobile station 100. In this case, the portion of the signal generator 230 represents the portion of the functional unit. The digital functions, such as generating the digital form of the test signal, of the signal generator 230 may be implemented in the base band part 104, for example using the digital signal processor and software of the system block 112. When at least a portion of the signal generator 230 is integrated into the mobile station 100, the analyser 260 may be external to the mobile station 100, or integrated at least partially into the mobile station 100. The test signal may be a signal dedicated to testing the device 200, 202, 204, or the test signal may be a generic signal used in the normal operation of the device 200, 202, 204.

In an embodiment, the test signal is characterized by predefined characteristics, such as voltage, current, frequency and a pulse sequence. The predefined characteristics may be defined by requirements set by the device 200, 202, 204 and possibly the measurement unit 250.

In an embodiment, the feeding line 210, 212, 214 is implemented by forming a trace on a semiconductor board, such as a silicon board. The feeding line 210, 212, 214 may also be implemented by using conventional cabling techniques known to a person skilled in the art.

An electric quantity is measured from the feeding line 210, 212, 214 by the measurement unit 250 integrated into the mobile station 100. The electric quantity may be current or voltage, for example. In an embodiment, the measurement unit 250 generates a voltage 252 proportional to the electrical quantity, which voltage represents the measurement result.

The measurement unit 250 outputs the measurement result into an input of the analyser 260, which determines the electric response of the device 200, 202, 204 to the electric test signal based on voltage. In an embodiment, the measurement result is conveyed by an analogue signal 252, in which the measurement result is presented, for example, by a voltage level. In another embodiment, the measurement result is conveyed to the analyser 260 by a digital signal 252, which contains the measurement result in a numeric form. For example, the measurement unit 250 measures the voltage of the electric test signal over the device 200, 202, 204, generates a voltage proportional to the measurement voltage, inputs the voltage to the analyser 260, which determines the electric response of the device 200, 202, 204 to the electric test signal based on the voltage proportional to the measurement voltage. For example, resistive properties of the device 200, 202, 204 may be tested by feeding a DC current to the device and monitoring voltage over the device 200, 202, 204 by the measurement unit 250.

The measurement unit 250 may be integrated into the mobile station 100 in various manners. In an embodiment, the measurement unit 250 is implemented in the base band part 104, for example, by forming the required component structure on a semiconductor board.

The integrity of the mobile station 100 and the measurement unit 250 enables scanning the device 200, 202, 204 using internal structures of the mobile station 100, thus reducing the need for accessing the feeding line 210, 212, 214 from outside the mobile station 100. The accessibility of the feeding lines 210, 212, 214 and the device 200, 202, 204 from outside a mobile station is, in general, difficult due to small dimensions of the electronics in a mobile station 100.

The electric response of the device 200, 202, 204 to the test signal characterises the functionality of the device. The electric response may be, for example, the power consumption of the device 200, 202, 204, which can be deduced from the current through the device 200, 202, 204 and the voltage applied over the device 200, 202, 204. In an embodiment, the electric response is the phase difference between the test signal and the electric quantity being measured. The phase difference may arise from, for example, impedance of components in the device 200, 202, 204. The electric response may also be a curve representing the electric quantity as a function of time, for example, when a capacitive device is tested. In an embodiment, the feeding line 210, 212, 214 comprises a measurement branch 220, 222, 224 for enabling remote measurement of the electric quantity from the feeding line 210, 212, 214. The measurement branch 220, 222, 224 provides sense lines to the measurement unit 240, thus enabling freedom, for example, in locating the measurement unit 240 in the mobile station 100 and possibly in an ASIC on which the measurement unit 250 is planted. In an embodiment, the measurement branch 220, 222, 224 is located at the device end of the feeding line 210, 212, 214 so that the effect of the electric response, such as resistance or impedance, of the feeding line 210, 212, 214 to the measurement of the electrical quantity is reduced. Locating the measurement branch 220, 222, 224 in the proximity of the device 200, 202, 204 results in reduced effects from the portion of the feeding line 210, 212, 214 between the measurement branch 220, 222, 224 and the device 200, 202, 204 to the electric response of the device 200, 202, 204 to the test signal. For example, the feeding line 210, 212, 214 may generate voltage drops to the test due to interconnecting cables and traces, which voltage drop is accounted for in the measurement of the electric quantity if the voltage drop occurs between the measurement branch 220, 222, 224 and the device 200, 202, 204. If the measurement branch 220, 222, 224 is located such that the voltage drop occurs between the measurement branch 220, 222, 224 and the generator 230, the effect of the voltage drop is not accounted for in the measurement of the electric quantity, and the measurement provides more realistic characterization for the device 200, 202, 204. Locating the measurement branch 220, 222, 224 in the proximity of the device 200, 202, 204 corresponds to isolating sense lines providing the measurement signal for the measurement unit 250 from the force lines providing the device 200, 202, 204 with the electric test signal. The separation enables measuring small impedances from the device 200, 202, 204. The measurement branch 220, 222, 224 may be implemented in a similar manner to the feeding line 210, 212, 214.

In an embodiment, an input impedance of the measurement unit 250 is chosen such that the accuracy of the electric response of the device 200, 202, 204 to the electric test signal is above a predefined value. The input impedance of the measurement unit 250 results in current through the measurement unit 250, which current disturbs the measurement of the electric quantity, such as voltage, from the feeding line 210, 212, 214.

The high impedance of the measurement unit 250 combined with locating the measurement branch 220, 222, 224 in the proximity of the device 200, 202, 204 may also be called a Kelvin arrangement for measuring an electric quantity from the feeding line 210, 212, 214. The Kelvin arrangement enables performing a measurement on the device 200, 202, 204 with a small effect of the measurement circuit on the measurement. The Kelvin arrangement enables, for example, an accurate measurement on a low impedance device 200, 202, 204. The high impedance of the measurement unit 250 may be defined in terms of the impedance of the device 200, 202, 204 under test. In an embodiment, the impedance ratio $r = Z_{meas}/Z_{device}$ is about 10000, where $Z_{meas}$ is the impedance of the measurement circuit and $Z_{device}$ is the impedance of the device 200, 202, 204 under test.

In an embodiment, the input impedance of the measurement unit 250 may range between 1 MΩ and 10 MΩ. However, the invention is not restricted to the above values, but the impedance of the measurement unit may be higher than 10 MΩ.

The analyser 260 receives a signal 252 carrying the measurement results of the electric quantity measured by the measurement unit 250. In an embodiment, at least a portion of the analyser 260 is integrated into the mobile station 100. In such a case, the portion of the analyser 260 represents the portion of the functional unit. The analyser 260 may be implemented in the base band part 104 using, for example, a digital signal processor and software. In an embodiment, the analyser 260 receives a digital signal 252 representing the measurement result of the electric quantity. The analyser 260 may process the digital signal 252, for example, by averaging, scaling, filtering, windowing or/and masking. In an embodiment, the signal generator 230 and the analyser 260 are integrated into the mobile station 100 by using the implementation described above.

In an embodiment, the mobile station comprises a switching unit 240 for connecting the measurement unit 240 to the feeding line 210, 212, 214. The switching unit 240 may be connected directly or via the measurement branch 220, 222, 224 to the feeding line 210, 212, 214. In an embodiment, the switching unit 240 is implemented with a transistor planted on a semiconductor board. In an embodiment, the switching unit 240 is a Kelvin switch with high impedance when the switching unit 240 is in the connecting state.

The switching unit 240 may also be capable of connecting the measurement unit 250 to a feeding line of plurality of feeding lines 200, 202, 204 one at a time. Thus, the output signal 242 from the switching unit 240 represents an electric quantity from either of the devices 200, 202, 204 under test. The arrangement enables using a single measurement unit 250, and a single setup of electronics for measuring several devices 200, 202, 204.

The arrangement may also comprise several measurements units 250, each of which is connected to a measurement-unit-specific switching unit 240 and an analyser 260 for enabling simultaneous tests for several devices 200, 202, 204 in the mobile station. The use of simultaneous tests reduces the testing time of each mobile station and improves the output of a test line in mass production.

In an embodiment, the arrangement comprises an evaluating unit 270 connected to the analyser 260 for evaluating the performance of the device 200, 202, 204, based on the electric response. The analyser 260 transmits information 262 on the electric response to the evaluation unit 270. Furthermore, the analyser may transmit information 254 to the external test system. If the electric response of the device 200, 202, 204 to the electric test signal fulfils requirements set for the electric response, the testing result is positive. The testing results may further be transmitted to the external test system 290.

In an embodiment, the evaluation unit 270 is integrated into the mobile station 100 by using the base band part 104, for example.

If the signal generator 230 and the analyser 260 are integrated into the mobile station 100, the mobile station 100 is capable of self-testing without external test equipment. The test procedure may be initialised by the user or it can be controlled from the network to which the mobile station is connected.

In an embodiment, a predefined electric test signal is generated by the signal generator 230 for testing a device 200, 202, 204 with a known electric response to the predefined electric test signal, and the performance of the device 200, 202, 204 is evaluated based on the known electric response and the electric response of the device 200, 202, 204 to the electric test signal. For example, if a discharge curve of voltage of a capacitor to be tested is known, the corresponding curve can be determined by charging the capacitor with a known voltage of the test signal. A measured discharge curve can be compared with the known curve, and the performance of the capacitor can be evaluated from the correspondence between the two curves. A similar procedure can be applied to other devices.

In an embodiment, the arrangement comprises a control unit 280 for controlling a test procedure for testing the device 210, 212, 214. The control unit 280 comprises, for example, a digital computer with memory means for processing and storing data associated with testing procedures of devices in a mobile station. The control unit 280 may be implemented in a base band part 104 of the mobile station 104.

In an embodiment, the control unit 280 receives a test command 286 to launch a testing procedure to test a device 200, 202, 204. The command 286 may be generated in the mobile station 100, based on a detected or assumed malfunction in a device 200, 202, 204 to be tested. It is also possible to receive the test command 286 from the external test system 290 while testing the mobile station 100 during a manufacturing stage or during service of the mobile station 100.

In an embodiment, the test command 286 is delivered to the mobile station by using a radio interface of a telecommunication system. The test command 286 may be generated by remote service personnel located in a network of the telecommunication system, for example, on a regular basis or based on an indication of a malfunction in the mobile station. Information on the test, such as information 254 from the analyser 260 or information 272 from the evaluating unit 270, may be transmitted from the mobile station to the service personnel for a detailed analysis. In such a case, some of the tasks of the evaluating unit 270 may be located in the network of the telecommunication system.

Some of the tasks of the control unit 280 may also be performed in the network. For example, the remote service personnel may specify details of the testing procedure, possibly based on an earlier analysis so that details of a malfunction can be investigated. After the analysis, the user of the mobile station may be informed about a need for delivering the mobile station for repair.

The control unit 280 may store data concerning characteristics of the test signal. For example, each device to be tested 200, 202, 204 may have device-specific testing parameters controlling, for example, the duration, voltage level and current to be applied to the test signal. The characteristics may be transmitted to the generator 230 by using a generator control signal 282. The switch position of the switching unit 240 may be controlled by a switch control signal 284.

In an embodiment, the device 200, 202, 204 is a radio frequency component, such as the amplifier unit 108, the RF ASIC 106 or the antenna unit 110 located in the radio frequency part 102. The electric components to be tested in the units listed may be, for example, a power amplifier, a low noise amplifier, an analogue-to-digital converter, a digital-to-analogue converter, a filter, a diode, or an antenna. If the device 200, 202, 204 is a radio frequency component, at least a portion of testing the elements, such as the generator 230, the measurement unit 250, the feeding line 210, 212, 214, the switching unit, and the analyser 260, may be located in the radio frequency part 102.

Figure 3:
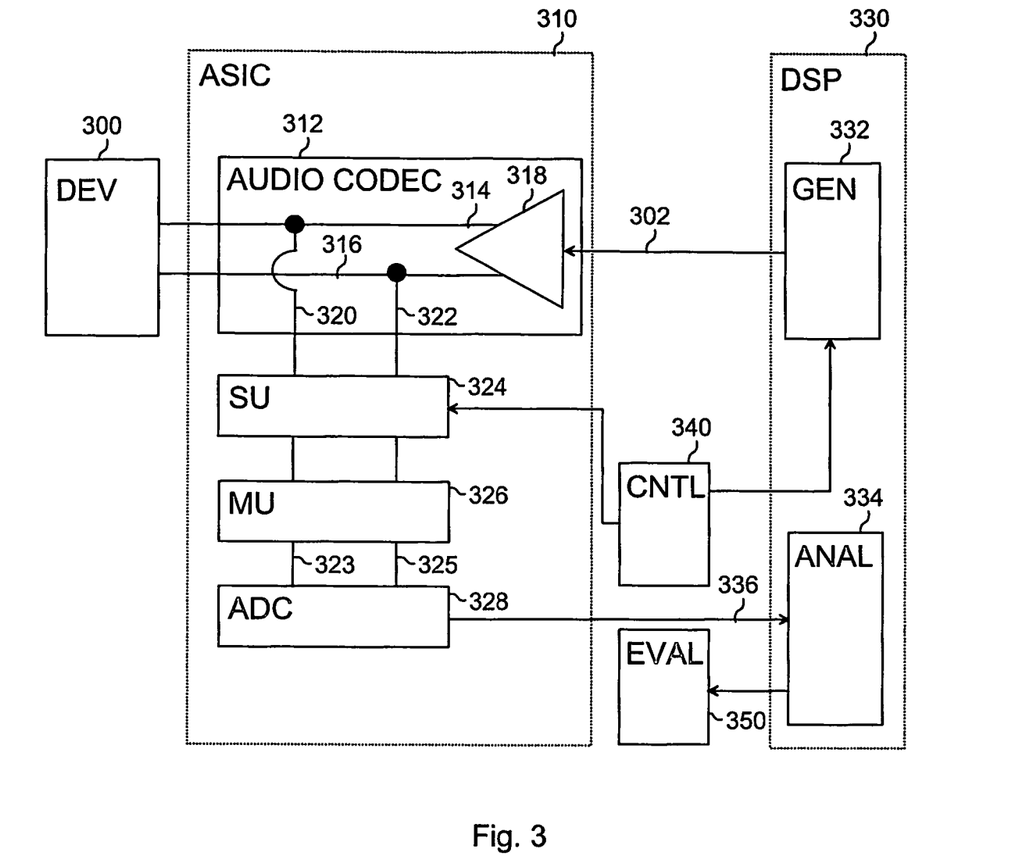
FIG. 3 shows an example of an arrangement for testing an audio device of a mobile station.

In an embodiment, the device 200, 202, 204 is a peripheral device 130-156. The present solution provides an efficient testing method and arrangement for testing a peripheral device 130-156 since the procedure tests an electric response instead of a functional response of a peripheral device 130-156. The functional response means, for example, sound reproduction of an audio device, such as a microphone 146 or an earphone 136, when a test signal is directed at the device 130-156. The functional response necessitates an external microphone/loudspeaker in order to perform conversion between a sound wave and an electric signal. The efficiency of determining the electric response arises from various factors, such as tolerance to external disturbance, such as noise and vibration from the test line, and a reduced need for changing a test platform between different tests. FIG. 3 shows an example of a testing arrangement for testing an earphone 300. The testing arrangement comprises an audio codec 312, a switching unit 324, a measurement unit 326, and an analogue-to-digital converter 328. The aforementioned elements may be implemented in a single application-specific integrated circuit 310. The arrangement further comprises a signal generator 332 and an analyser 334 implemented with a digital signal processor 330 of the system block 112 of the mobile station 100. The control unit 340 and the evaluation unit 350 are also shown.

The signal generator 332 feeds a test signal 302 into the audio codec 312, which comprises an amplifier 318 for amplifying the test signal 302 and feeding the test signal 302 into the feeding line. The feeding line comprises a first pole 314 and a second pole 316 for providing an input and an output for the current associated with the test signal. The measurement branches 320 and 322 of the first pole 314 and the second pole 316, respectively, are connected to the switching unit 324, which further conducts the measurement branches 320, 322 to the measurement unit 326 when the switching unit 324 is turned on. The measurement unit 326 determines voltage between the first pole 314 and the second pole 316 and provides output voltage 323, 325 to the analogue-to-digital converter 328. The analogue-to-digital-converter 328 outputs the output voltage 323, 325 in digital form 336 to the analyser 334 for processing. The analyser 334 outputs the processing results, such as the average of the measurement result, to the evaluating unit 350 for evaluating the performance of the headphone 300.

Figure 4:
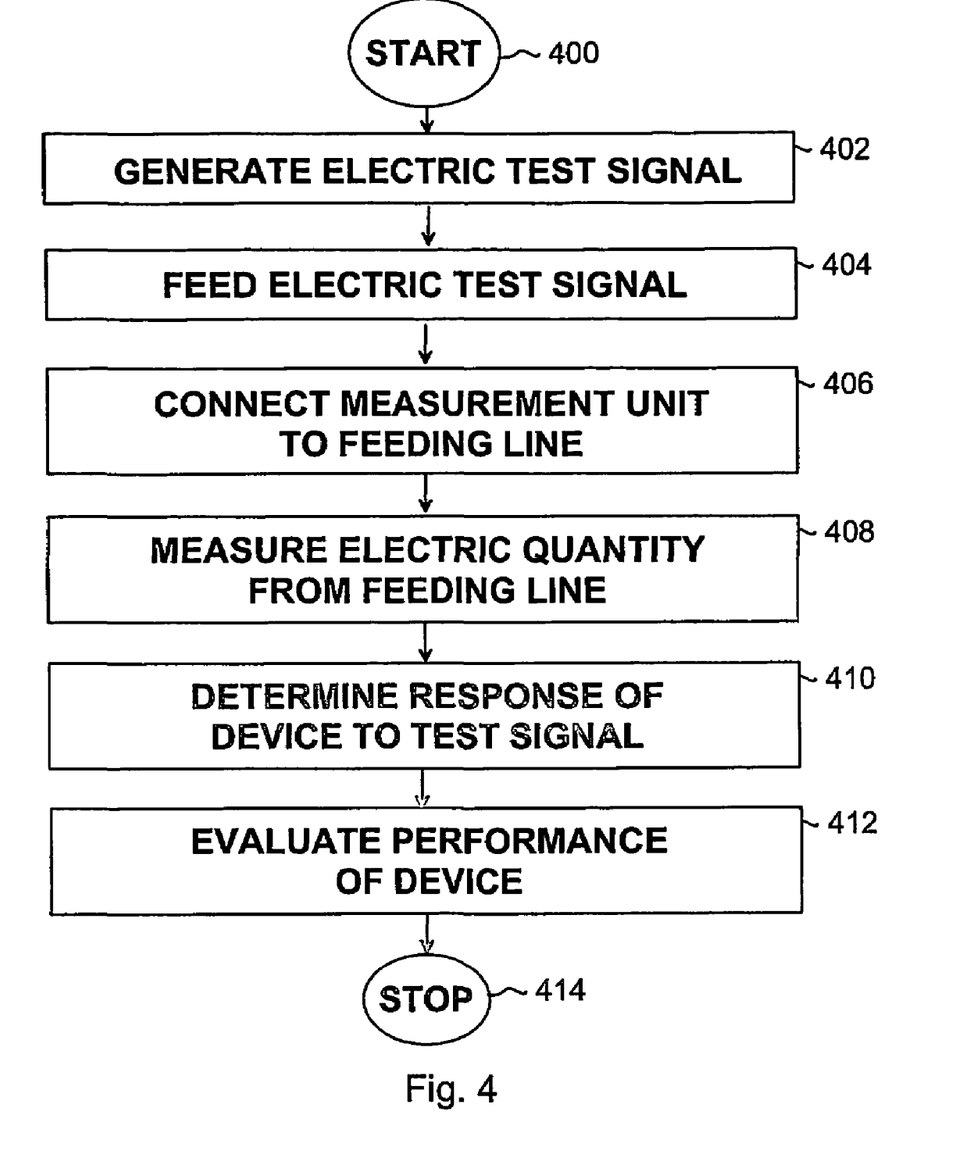
FIG. 4 shows a flow chart illustrating embodiments of the invention.

With reference to FIG. 4, embodiments of the invention are illustrated by means of a block diagram. In start 400, the method is started. In 402, an electric test signal is generated. In 404, the electric test signal is fed to a device 200, 202, 204. In 406, a measurement unit 406 is connected to the feeding line 210, 212, 214 by a switching unit 240. In 408, an electric quantity, such as voltage, is measured from the feeding line 210, 212, 214. In 410, electric response of the device 200, 202, 204 to the electric test signal is determined by the analyser 260. In 412, performance of the device 200, 202, 204 is evaluated based on the electric quantity. In 414, the method is stopped.

Even though the invention is described above with reference to an example according to the accompanying drawings, it is clear that the invention is not restricted thereto but can be modified in several ways within the scope of the appended claims.

The invention claimed is:

1. A method comprising:
   generating an electric test signal for testing a device of a mobile station;
   feeding the electric test signal to the device by a feeding line;
   measuring an electric quantity from the feeding line by a measurement unit integrated into the mobile station;
   determining an electric response of the device to the electric test signal based on the electric quantity; and
   performing at least a portion of the testing procedure for testing the mobile station by using a functional unit integrated into the mobile station, the testing procedure comprising generating the electric test signal and determining the electric response of the device.

2. The method of claim 1, further comprising evaluating performance of the device based on the electric response.

3. The method of claim 1, further comprising connecting the measurement unit to the feeding line.

4. The method of claim 1, wherein the step of generating the electric test signal comprises generating the electric test signal by a signal generator integrated at least partially into the mobile station.

5. The method of claim 1, wherein determining the electric response further comprises determining the electric response of the device to the electric test signal by an analyser integrated at least partially into the mobile station.

6. The method of claim 1, further comprising:
   measuring the voltage of the electric test signal over the device; and
   determining the electric response of the device to the electric test signal, based on the voltage.

7. The method of claim 1, further comprising:
   generating a predefined electric test signal for testing a device with a known electric response to the predefined electric test signal; and
   evaluating performance of the device based on the known electric response and the electric response of the device to the electric test signal.

8. The method of claim 1, wherein the step of measuring comprises measuring the electric quantity by a measurement unit with an input impedance chosen such that the accuracy of the electric response of the device to the electric test signal is above a predefined value.

9. The method of claim 1, further comprising connecting a measurement unit measuring the electric quantity to a feeding line of a device of plurality of devices; and
   measuring the electric quantity from a feeding line of a device of plurality of devices.

10. The method of claim 1, wherein the device is a peripheral device.

11. An arrangement for testing a device of a mobile station, comprising:
   a signal generator for generating an electric test signal for testing a device;
   a feeding line connected to the signal generator and the device, for feeding the electric test signal to the device;
   a measurement unit connected to the feeding line, for measuring an electric quantity from the feeding line;
   an analyser connected to the measurement unit, for determining an electric response of the device to the electric test signal based on the electric quantity;
   wherein at least a portion of a testing arrangement is integrated into the mobile station, the testing arrangement comprising the signal generator and the analyser.

12. The arrangement of claim 11, wherein the arrangement further comprises an evaluating unit connected to the analyser for evaluating performance of the device based on the electric response.

13. The arrangement of claim 11, wherein the mobile station comprises a switching unit for connecting the measurement unit to the feeding line.

14. The arrangement of claim 11, wherein at least a portion of the signal generator is integrated into the mobile station.

15. The arrangement of claim 11, wherein at least a portion of the analyser is integrated into the mobile station.

16. The arrangement of claim 11, wherein the measurement unit is configured to measure voltage of the electric test signal over the device; and wherein the analyser is configured to determine the electric response of the device to the electric test signal, based on the voltage.

17. The arrangement of claim 11, wherein the signal generator is configured to generate a predefined electric test signal for testing a device with a known electric response to the predefined electric test signal; and
   wherein the evaluating unit is configured to evaluate performance of the device based on the known electric response and the electric response of the device to the electric test signal.

18. The arrangement of claim 11, wherein an input impedance of the measurement unit is chosen such that the accuracy of the electric response of the device to the electric test signal is above a predefined value.

19. The arrangement of claim 11, wherein the mobile station comprises a plurality of devices with a plurality of feeding lines;
   wherein the mobile station comprises a switching unit for connecting the measurement unit to the feeding line of the device of a plurality of devices one at a time; and
   wherein the measurement unit is configured to measure the electric quantity from the feeding line of the device from a plurality of devices.

20. The arrangement of claim 11, wherein the device is a peripheral device.

* * * * *